United States Patent
Simpson et al.

(10) Patent No.: US 7,864,858 B2
(45) Date of Patent: Jan. 4, 2011

(54) TECHNIQUES FOR MINIMIZING MEMORY BANDWIDTH USED FOR MOTION COMPENSATION

(75) Inventors: Miles Simpson, Belmont, CA (US); Dan Bell, San Jose, CA (US); Mark Rygh, Union City, CA (US)

(73) Assignee: Magnum Semiconductor, Inc., Milpitas, CA (US)

( * ) Notice: Subject to any disclaimer, the term of this patent is extended or adjusted under 35 U.S.C. 154(b) by 1483 days.

(21) Appl. No.: 11/175,109

(22) Filed: Jul. 5, 2005

(65) Prior Publication Data

US 2006/0056514 A1    Mar. 16, 2006

Related U.S. Application Data

(60) Provisional application No. 60/585,072, filed on Jul. 6, 2004.

(51) Int. Cl.
  H04N 11/02    (2006.01)
  H04N 7/12     (2006.01)
  H04N 11/04    (2006.01)
  H04B 1/66     (2006.01)

(52) U.S. Cl. ............................... 375/240.16; 375/240.12

(58) Field of Classification Search ............. 375/240.16
  See application file for complete search history.

(56) References Cited

U.S. PATENT DOCUMENTS

| | | | | |
|---|---|---|---|---|
| 5,999,189 A | * | 12/1999 | Kajiya et al. | 382/232 |
| 6,028,612 A | * | 2/2000 | Balakrishnan et al. | 345/544 |
| 6,525,783 B1 | * | 2/2003 | Kim et al. | 348/714 |
| 7,577,763 B1 | * | 8/2009 | Beaman | 710/6 |

* cited by examiner

*Primary Examiner*—Andy S. Rao
*Assistant Examiner*—Hee-Yong Kim
(74) *Attorney, Agent, or Firm*—Robert Platt Bell

(57) ABSTRACT

In a motion compensation engine, a number of blocks are provided for re-ordering motion vector (MV) reference positions prior to fetch. An MV Sort & Group block outputs MVs one at a time to a Decomposer block. The Decomposer block takes each MV and decomposes it into a series of DRAM read commands consisting of DRAM addresses. This rectangular region is divided into pixel words, which correspond to addressable DRAM words. The addresses are then sent to an Overlap Remover block, which comprises a bitmap corresponding to the DRAM addresses sent to it from the Decomposer block. Before a group is received, the bitmap is cleared by setting all coordinates to "0". Each address received causes the Overlap Remover to set a bit to "1" in the bitmap which corresponds to a relative (x,y) coordinate within a small bounded rectangular region. Addresses received within a group, which are the same as previous addresses, are overlapping addresses and the corresponding bit will simply remain set to "1".

22 Claims, 2 Drawing Sheets

TECHNIQUES FOR MINIMIZING MEMORY BANDWIDTH USED FOR MOTION COMPENSATION

CROSS-REFERENCE TO RELATED APPLICATIONS

N/A

FIELD OF THE INVENTION

The present invention relates to motion compensation in video stream decoding. In particular, the present invention is directed toward a technique for minimizing memory bandwidth used for motion compensation, particularly in decoding MPEG data streams.

BACKGROUND OF THE INVENTION

Motion compensation is a key ingredient of many video compression standards. The older MPEG-2 standard uses two motion vectors in the formation of the prediction of its B-type macroblock. In MPEG-2 encoded data streams, B-type frames may comprise a number of macroblocks. Each macroblock may comprise four blocks of 8×8 pixels, where each pixel may comprise YUV data.

FIG. 2 is a simplified diagram illustrating the relationship of a macroblock from an I-type or P-type frame and the motion vector. I-type or P-type frame 210 includes a macroblock 230 located at a particular position in the frame. B-type frame 220 relocates macroblock 230 to new position 230A as indicated by motion vector 240. Thus, a B-type frame may include motion vector data representing relocation of previously defined macroblocks of pixel data. The motion vector may represent movement of the macroblock from a previously decoded I-type or P-type frame. Thus, when decoding a B-type frame, the decoder need not decode entire macroblock data, but instead can utilize macroblock pixel data decoded from a previous I-type or P-type frame. The motion vector data can then be used to move the pixel data to a new location for the B-frame, as indicated in FIG. 2. The motion vector can actually point to a new location between pixels (½ pixel granularity) and the pixel data interpolated to form new pixel data for the B-type frame.

Recently emerging standards, such as MPEG4-2, DivX, WMV9 and H.264 (MPEG4-10), require support for a higher density of motion vectors, and their implementations require a heavier use of memory. WMV9 has a 4MV mode, which defines 4 motion vectors for the same 16×16 macroblock region—one for each 8×8 sub-region. MPEG4-10 requires support for as many as 16 independent motion vectors per macroblock. MPEG4-2 has a Global Motion Compensation (GMC) mode, which defines a separate motion vector for each luminance pixel of the 16×16 macroblock, which adds up to 256 motion vectors per macroblock.

A higher motion vectors density translates to a larger number of memory fetches where each fetch comprises fewer reference pixels. In the case of MPEG4-10, each row fetched may consist of as few as 4 pixels (32 bits). In the case of the MPEG4-2 GMC mode, each row might only be 2 pixels wide (16 bits).

These more recent compression standards also have higher memory bandwidth requirements. From the IC and system point of view, higher bandwidth requirements translate to a wider memory data path. Synchronous DRAM is widely used today including a variant called DDR (double-data-rate) DRAM. The smallest randomly readable 32-bit DDR DRAM word is 64-bits wide since one address reads data on both the rising and falling edges of the clock. Likewise, a 64-bit DDR DRAM has a 128-bit effective word size.

The combination of smaller reference block sizes and a larger memory data path results in more wasted motion compensation related memory bandwidth. Non-aligned reads fetch unused pixels to the left and to the right of the required pixels. Also, typically a great deal of overlap exists between motion vectors since they are more likely to point to the same memory words. Certain memory words are therefore fetched multiple times as they are used for separate motion compensation operations based on separate motion vectors.

Thus, it remains a requirement in the art to provide a technique for minimizing memory bandwidth used for motion compensation in video compression decoding.

SUMMARY OF THE INVENTION

The best solution for this dichotomy is a technique which sorts and groups motion vectors by proximity and then removes any overlap between them before generating memory fetch commands. The idea of reordering motion vectors before fetching is novel, along with the specific implementation disclosed herein.

In the motion compensation engine of the present invention, a number of blocks are provided for re-ordering Motion Vector Reference Positions prior to fetch. These blocks may be implemented in software or hardware since they do not perform time-critical operations. The term "reference position" is not a generally used term and is used with special meaning in the present invention. A reference position is similar to a motion vector, but it is more closely related to a physical memory address than a simple displacement. It results from combining the motion vector with the currently decoded block position, the reference field or frame it refers to, and the color component currently being processed.

Motion Vector Reference Positions (MVRPs) are sent over a bus one at a time. The MVRPs are sorted in numerical order and then grouped by an MV Sort & Group block. The block contains a small local memory or buffer, which holds MVRPs as they are sent in. The MVRPs are sorted and stored as they arrive. After they are sorted, they are guaranteed to be in raster-scan proximity order, such that the closest ones to the right are first, followed by the closest ones vertically below.

Grouping simply involves a second pass over the sorted MVs, which calculates the smallest rectangle that can hold a sub-group of them. The first MV is read out of the buffer and sent along to the Decomposer block followed by the second MV. An ever-increasing rectangle, which bounds the MVs, is calculated as each MV is sent. Once the rectangle is about to exceed a predetermined size, an "end of buffer" (EOB) signal marks the last MV of the group as that MV is sent to the Decomposer. All of the MVRPs between EOBs are part of the same group.

Eventually, processing and memory fetch will produce a region of reference pixels, which are stored in a rectangular buffer, which corresponds to this group. The motion compensation blocks may then process the contents of the buffer. At this point, the MV Sort & Group block outputs MVRPs one at a time to the Decomposer block. The EOB is sent as a sideband signal to mark the last MV of the group.

The Decomposer block takes each MV and decomposes it into a series of DRAM read commands consisting of DRAM addresses. An MV represents a rectangular region of pixels from a reference frame. The width and height of that region are determined by the compression standard (MPEG2, MPEG4, WMV9, MPEG4-10), the mode of operation (GMC, 1MV, 4MV, 4×4, etc) and which sub-pixel the original motion vector points to. This rectangular region is broken down into pixel groups, which correspond to addressable DRAM words. If the DRAM word size were 64 bits, then the rectangle would be broken down into 8 pixel groups, each readable from DRAM in one clock cycle.

The addresses corresponding to each 8-pixel group may then be sent along to the Overlap Remover block in raster-scan order (left-to-right, top-to-bottom). The EOB signal is also passed along, but modified to mark the last address of the last MV of the group.

The Overlap Remover block comprises a local memory or buffer, which stores a bitmap corresponding to DRAM addresses passed to it from the Decomposer block. Before a group is received, the bitmap is cleared. Each address received causes the Overlap Remover to set a bit in the bitmap which corresponds to a relative (x,y) coordinate within a small bounded rectangular region. Addresses received within a group, which are the same as previous addresses, are overlapping addresses and the corresponding bit will simply remain set. Once the EOB signal is detected with the final address received for a group, the Overlap Remover reads the bitmap and translates the set bits back into addresses which it uses to generate DRAM read commands. The Overlap remover then sends each read command one at a time to the memory controller which retrieves corresponding data words and returns them to the motion compensation engine of FIG. 1.

Three FIFO blocks act to queue simple motion compensation commands. These commands are, in turn, used to process the buffers that are returned by the DRAM controller. These buffers contain pixels from small rectangular regions of reference memory. Each buffer is the result of a group of DRAM read commands sent to the memory controller by the Overlap Remover block. Fully processed macroblock prediction blocks are output and later combined with IDCT or reverse transform error terms to produce reconstructed macroblocks.

DETAILED DESCRIPTION OF THE INVENTION

Figure 1:
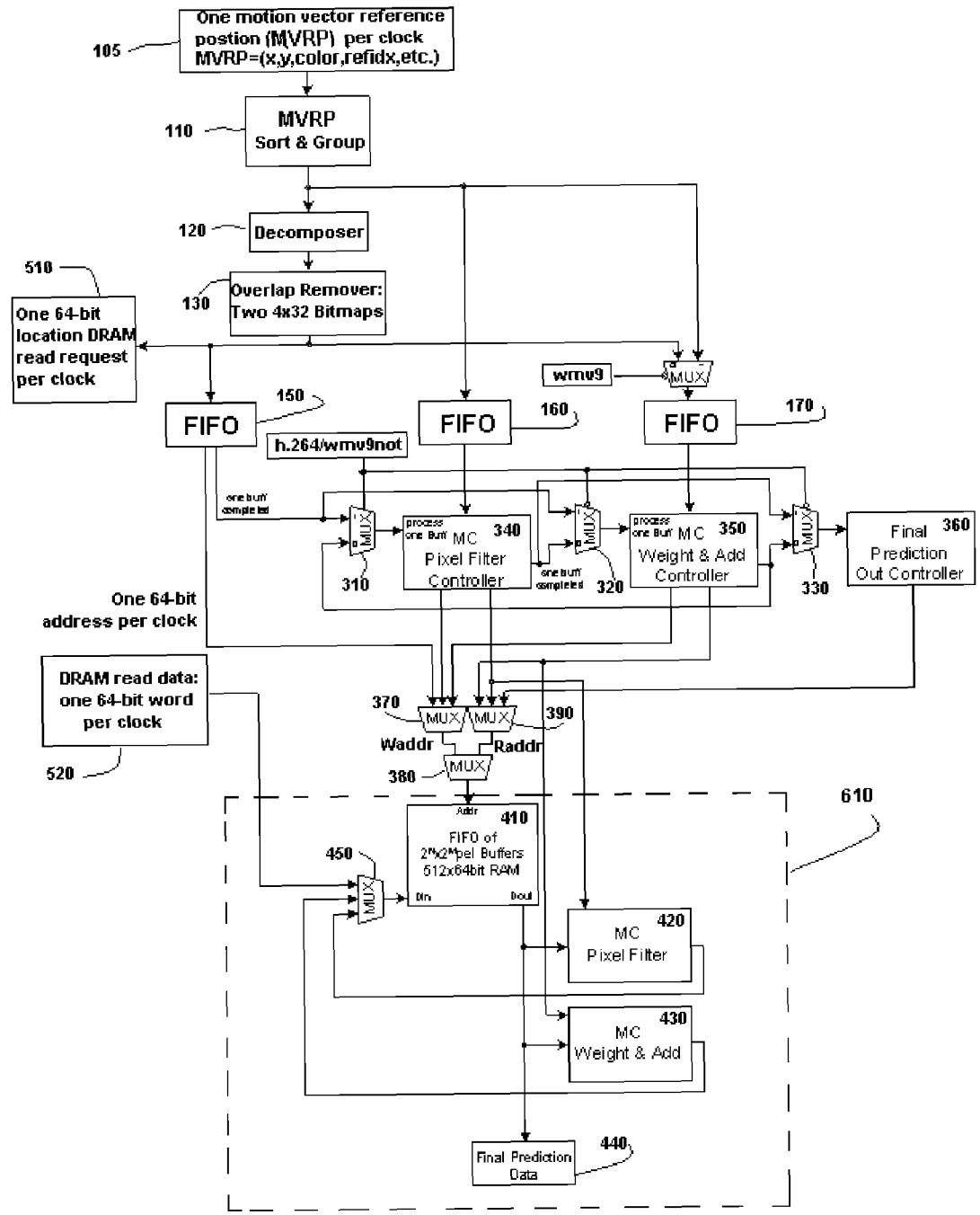
FIG. 1 illustrates a block diagram for an exemplary implementation of a motion compensation engine according to the present invention.
Figure 2:
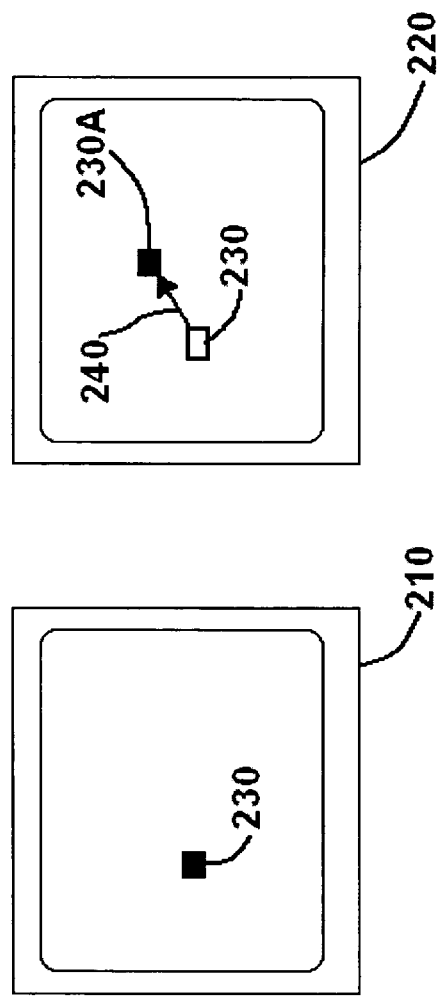
FIG. 2 is a diagram illustrating how a macroblock may be rendered using a motion vector in a B-type frame according to the prior art.

FIG. 1 illustrates a block diagram for an exemplary implementation of a motion compensation engine according to the present invention. Blocks 110, 120, and 130 in the upper-left-hand corner implement the technique of re-ordering Motion Vector Reference Positions prior to fetch. These three blocks may be implemented in software or hardware since they do not perform time critical operations.

Block 105 represents a "reference position", a term not generally used in the art, but is used with special meaning with regard to the present invention. A reference position is defined herein as similar to a motion vector, but it is more closely related to a physical memory address than a simple displacement. The reference position results from combining the motion vector with the currently decoded block position, the reference field or frame it refers to, and the color component currently being processed.

The general input to the block diagram in FIG. 1 is a bus, which sends in Motion Vector Reference Positions (MVRPs) 105 one at a time. Motion Vector Reference Positions 105 are sorted in numerical order and then grouped by the MV Sort & Group block 110. MV Sort & Group block 110 contains a small local memory or buffer, which holds MVRPs as they are sent in.

MVRPs 105 are sorted and stored as they arrive in block 110. After they are sorted, they are guaranteed to be in raster-scan proximity order, such that the closest ones to the right are first in order, followed by the closest ones vertically below.

Grouping in block 110 simply involves a second pass over the sorted MVs, which calculates the smallest rectangle, which can hold a sub-group of them. The first MV is read out of the buffer and sent along to Decomposer block 120, followed by the second. An ever-increasing rectangle, which bounds the MVRPs may then be calculated as each MV is sent. Once the rectangle is about to exceed a predetermined size, an "end of buffer" (EOB) signal marks the last MV of the group as that MV is sent to Decomposer 120. All of the MVRPs between EOBs are part of the same group.

Eventually, processing and memory fetch will produce a region of reference pixel values, which are stored in a rectangular buffer that corresponds to this group. In this context, the term "pixel" refers not only to a physical manifestation of a spot on a display screen, but also as data representing values for graphical display for a portion of an image. The motion compensation blocks (420, 430) at the bottom of FIG. 1 may then process the contents of the buffer, as will be discussed in more detail. MV Sort & Group block 110 outputs MVRPs one at a time to Decomposer block 120. The EOB is sent as a sideband signal to mark the last MV of the group.

Decomposer block 120 takes each MV and decomposes it into a series of DRAM read commands consisting of DRAM addresses. An MV represents a rectangular region of pixel images from a reference frame. The width and height of that region are determined by the compression standard (MPEG2, MPEG4, WMV9, MPEG4-10), the mode of operation (GMC, 1MV, 4MV, 4×4, etc) and which sub-pixel the original motion vector points to. This rectangular region is broken down into pixel groups, which correspond to addressable DRAM words. If the DRAM word size were 64 bits, then the rectangle would be divided into 8-pixel groups, each readable from DRAM in one clock cycle.

The addresses corresponding to each 8-pixel group are then sent along to Overlap Remover block 130 in raster-scan order (left-to-right, top-to-bottom). The EOB signal is also passed along, but modified to mark the last address of the last MV of the group.

Overlap Remover block 130 comprises a local memory or buffer, which stores a bitmap corresponding to DRAM addresses passed to it from Decomposer block 120. Before a group is received, the bitmap is cleared. Each address received causes Overlap Remover 130 to set a bit in the bitmap, which corresponds to a relative (x,y) coordinate within a small bounded rectangular region. This bitmap acts in a manner similar to a memory mask. Addresses received within a group, which are the same as previous addresses, are overlapping addresses, and the corresponding bit will simply remain set. Thus, operations need only be performed once for a particular pixel.

Once the EOB signal is detected with the final address received for a group, Overlap Remover 130 reads the bitmap and translates the set bits back into addresses which it uses to generate DRAM read commands. If a particular bit in the bitmap is set more than once, only one DRAM read command will still be generated. Thus, unlike the Prior Art, where individual DRAM read commands are generated based upon the Motion Vectors, the present invention, utilizing the bitmap mask, eliminates duplicative DRAM read commands, thus minimizing the memory bandwidth required for motion compensation operations.

Overlap remover 130 sends each read command 510 one at a time to the memory controller, which retrieves the corresponding data words 520, multiplexed (MUXed) in multiplexer (MUX) 450 with address data from Motion Compensation (MC) Pixel filter 420 and Motion Compensation (MC) Weight and Add 430, and returns them to the motion compensation engine 510 shown in the lower half of FIG. 1.

The three FIFO blocks 150, 160, and 170 at the center of FIG. 1 act to queue simple motion compensation commands, which in turn may be processed by Motion Compensation (MC) pixel filter controller 340, Motion Compensation (MC) weight and add controller 350, and final prediction out controller 360. MUXes 310, 320, and 330 may be used to selectively transmit data between FIFO 150 and motion compensation blocks 340, 350, and 360. The data from motion compensation blocks 340, 350, and 360 may then be combined in MUXes 370, 380, and 390 and in turn used by the blocks 420, 430 at the bottom of FIG. 1 to process the buffers 410 that are returned by the DRAM controller. These buffers 410 contain pixels from small rectangular regions of reference memory. Each buffer is the result of a group of DRAM read commands 510 sent to the memory controller by Overlap Remover block 130.

Fully processed macroblock prediction blocks 440 are output at the bottom of FIG. 1, which are later combined with IDCT or reverse transform error terms to produce reconstructed macroblocks.

As illustrated in FIG. 1, the use of the Motion Vector sort and group 110,

Decomposer 120, and overlap Remover 130 results in a more efficient use of memory bandwidth. Using the sort and overlap removal process, duplicate calls to memory addresses are eliminated by setting bits in the memory bit map such that each address is accessed only once in the Motion Compensation process.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A method of optimizing memory access when performing motion compensation, comprising:
   receiving a plurality of Motion Vector Reference Positions, each of the plurality of Motion Vector Reference Positions comprising a combination of a corresponding motion vector combined with a currently decoded block position, a reference field or frame the corresponding motion vector refers to, and a color component currently being processed,
   decomposing, in a decomposer, each Motion Vector Reference Position into a series of memory commands comprising memory addresses,
   sorting the Motion Vector Reference Positions in raster-scan proximity order, and
   grouping, in a buffer, the Motion Vector Reference Positions in raster-scan proximity order.

2. The method of claim 1, wherein grouping comprises:
   calculating a smallest representative rectangle which can hold a group of Motion Vector Reference Positions, and
   calculating another representative rectangle bounding the group of Motion Vector Reference Positions as each of the group of Motion Vector Reference Positions is read from the buffer,
   wherein once the another representative rectangle is about to exceed a predetermined size, an end of buffer (EOB) signal marks a last Motion Vector Reference Position of the group of Motion Vector Reference Positions, such that all Motion Vector Reference Positions between EOBs are part of a same group of Motion Vector Reference Positions.

3. The method of claim 2, further comprising:
   sorting a region of reference pixel images in a rectangular buffer storing the group of Motion Vector Reference Positions; and
   motion compensation processing the contents of the rectangular buffer.

4. The method of claim 3, further comprising:
   dividing the representative rectangle into pixel groups, each of which correspond to addressable memory words.

5. The method of claim 4, wherein the memory word size is 64 bits and the rectangular region is broken down into 8-pixel groups, each group read from memory one clock cycle, wherein memory addresses corresponding to each 8-pixel group are sent to an overlap remover in raster-scan order, along with the EOB signal modified to mark a last address of a last motion vector reference position of a corresponding 8-pixel group.

6. The method of claim 5, further comprising:
   storing in the overlap remover, a bitmap corresponding to memory addresses sent from the decomposer, wherein each address received causes the overlap remover to set a bit in the bitmap corresponding to a relative coordinate within the rectangular region.

7. The method of claim 6, wherein addresses received within a corresponding 8-pixel group, that are the same as previous addresses, are overlapping addresses and the corresponding bit in the bitmap remains set.

8. The method of claim 7, wherein once the EOB signal is detected with the final address received for a corresponding 8-pixel group, the overlap remover reads the bitmap and translates the set bits back into addresses used to generate memory read commands.

9. The method of claim 8, further comprising:
   sending from the overlap remover, each read command one at a time to a memory controller which retrieves corresponding data words and returns them to the motion compensation engine without having to read the same memory address twice.

10. The method of claim 1, wherein each of the plurality of Motion Reference Vector Positions represents a rectangular region of pixels from a reference frame, in which width and height of the rectangular region are determined by a compression standard, mode of operation, and to which sub-pixel an original motion vector points.

11. A method of optimizing memory access for motion compensation, comprising:
   sorting a plurality of motion Motion Vector Reference Positions into raster scan order for a representative rectangular area, where each of the plurality of Motion Vector Reference Positions comprising a combination of a corresponding motion vector combined with a currently decoded block position, a reference field or frame the corresponding motion vector refers to, and a color component currently being processed;

converting the Motion Vector Reference Positions to corresponding memory addresses;
generating a bitmap representing memory addresses and setting each bit in the bitmap once for each of the memory addresses converted from the Motion Vector Reference Positions; and
using the bitmap to generate a list of memory addresses for memory access such that duplicate access of the same memory address is avoided during rendering of the plurality of motion vectors.

12. A motion compensation system of optimizing memory access when performing motion compensation, comprising:
an input for receiving a plurality Motion Vector Reference Positions, each of the plurality of Motion Vector Reference Positions comprising a combination of a corresponding motion vector combined with a currently decoded block position, a reference field or frame the corresponding motion vector refers to, and a color component currently being processed;
a decomposer for decomposing each of the plurality of Motion Vector Reference Position into a series of memory commands comprising memory addresses;
a sorter for sorting the Motion Vector Reference Positions in raster scan order; and
a buffer for storing the Motion Vector Reference Positions in raster-scan proximity order.

13. The motion compensation system of claim 12, wherein the sorter further comprises:
a first calculator for calculating a smallest representative rectangle which can hold a group of Motion Vector Reference Positions; and
a second calculator for calculating another representative rectangle bounding the group of Motion Vector Reference Positions as each of the group of Motion Vector Reference Positions are read from the buffer,
wherein once the another representative rectangle is about to exceed a predetermined size, an end of buffer (EOB) signal marks a last Motion Vector Reference Position of the group of Motion Vector Reference Positions, such that all Motion Vector Reference Positions between EOBs are part of a same group of Motion Vector Reference Positions.

14. The motion compensation system of claim 13, further comprising: another sorter for sorting a region of reference pixels in a rectangular buffer corresponding to the group; and a motion compensation processor for motion compensation processing the contents of the rectangular buffer.

15. The motion compensation system of claim 14, wherein the decomposer divides the representative rectangle into pixel groups, each group of which corresponds to addressable memory words.

16. The motion compensation system of claim 15, wherein the memory word size is 64 bits and the rectangular region is divided by the decomposer into 8-pixel groups, each read from memory one clock cycle, the motion compensation system further comprising:

an overlap remover for receiving memory addresses corresponding to each 8-pixel group in raster-scan order, along with the EOB signal modified to mark a last address of a last motion vector reference position of a corresponding 8-pixel group.

17. The motion compensation system of claim 16, wherein the overlap remover stores a bitmap corresponding to memory addresses passed from the decomposer, wherein each address received causes the overlap remover to set a bit in the bitmap corresponding to a relative coordinate within the rectangular region.

18. The motion compensation system of claim 17, wherein addresses received within a corresponding 8-pixel group in the overlap remover that are the same as previous addresses are overlapping addresses and the corresponding bit in the bitmap remains set.

19. The motion compensation system of claim 18, wherein once the EOB signal is detected by the overlap remover with the final address received for a corresponding 8-pixel group, the overlap remover reads the bitmap and translates the set bits back into addresses used to generate memory read commands.

20. The motion compensation system of claim 19, wherein the overlap remover sends each read command one at a time to a memory controller which retrieves corresponding data words and returns them to the motion compensation engine without having to read the same memory address twice.

21. The motion compensation system of claim 12, wherein the Motion Vector Reference Position represents a rectangular region of pixels from a reference frame, in which width and height of the rectangular region are determined by a compression standard, mode of operation, and to which sub-pixel an original motion vector points.

22. A motion compensation system of optimizing memory access for motion compensation, comprising:
a sorting block for sorting a plurality of Motion Vector Reference Positions into raster-scan proximity order for a rectangular area, each of the plurality of Motion Vector Reference Positions comprising a combination of a corresponding motion vector combined with a currently decoded block position, a reference field or frame the corresponding motion vector refers to, and a color component currently being processed;
a decomposer block for converting the Motion Vector Reference Positions to memory addresses;
an overlap remover for generating a bitmap representing memory addresses and setting each bit in the bitmap once for each memory address converted from Motion Vector Reference Positions, and using the bitmap to generate a list of memory addresses for memory access such that duplicate access of the same memory address is avoided.

* * * * *